United States Patent
Kang et al.

(10) Patent No.: US 10,983,874 B2
(45) Date of Patent: Apr. 20, 2021

(54) PROCESSING A RECOVER STATE INPUT/OUTPUT REQUEST

(71) Applicant: EMC IP Holding Company LLC, Hopkinton, MA (US)

(72) Inventors: Jianbin Kang, Beijing (CN); Jian Gao, Beijing (CN); Geng Han, Beijing (CN); Hongpo Gao, Beijing (CN); Lei Sun, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 134 days.

(21) Appl. No.: 16/249,149

(22) Filed: Jan. 16, 2019

(65) Prior Publication Data

US 2019/0220372 A1 Jul. 18, 2019

(30) Foreign Application Priority Data

Jan. 18, 2018 (CN) .......................... 201810050580.3

(51) Int. Cl.
*G06F 11/14* (2006.01)
*G06F 12/0804* (2016.01)
*G06F 11/10* (2006.01)

(52) U.S. Cl.
CPC ...... *G06F 11/1469* (2013.01); *G06F 11/1076* (2013.01); *G06F 12/0804* (2013.01); *G06F 2201/82* (2013.01); *G06F 2212/1032* (2013.01); *G06F 2212/608* (2013.01)

(58) Field of Classification Search
CPC ...... G06F 11/14; G06F 11/1464; G06F 11/10; G06F 11/1076

USPC ............................................................ 714/19
See application file for complete search history.

(56) References Cited

U.S. PATENT DOCUMENTS

| | | | | |
|---|---|---|---|---|
| 5,533,190 A | * | 7/1996 | Binford | G06F 11/1084 714/6.21 |
| 5,878,202 A | * | 3/1999 | Sakuma | G06F 11/1435 714/6.12 |
| 6,167,485 A | | 12/2000 | Kedem | |
| 6,195,761 B1 | | 2/2001 | Kedem | |
| 6,233,696 B1 | | 5/2001 | Kedem | |
| 6,389,511 B1 | | 5/2002 | Kedem | |
| 6,535,994 B1 | | 3/2003 | Kedem | |
| 6,546,500 B1 | * | 4/2003 | Miyamoto | G06F 11/1451 714/5.1 |
| 7,275,179 B1 | * | 9/2007 | Coatney | G06F 11/1084 714/6.32 |
| 7,647,526 B1 | * | 1/2010 | Taylor | G06F 11/1092 714/6.32 |

(Continued)

*Primary Examiner* — Kamini B Patel
(74) *Attorney, Agent, or Firm* — BainwoodHuang

(57) ABSTRACT

A storage system comprises a cache device and a storage device group. A technique involves: the cache device of the storage system receiving from a host an input/output (I/O) request for the storage system; and upon determining that the storage system is just recovered from a hardware failure and the storage device group in the storage system is in a ready but degraded state, safely performing data write/read by sending a new Recover State I/O request to the storage device group. Such a technique may be used to reduce a Data Lost window, reduce or avoid data loss. In addition, such a technique may be implemented in a current RAID technology, namely, can be used in combination with the current RAID technology.

20 Claims, 7 Drawing Sheets

(56) References Cited

U.S. PATENT DOCUMENTS

| | | | |
|---|---|---|---|
| 7,664,991 B1* | 2/2010 | Gunda | G06F 11/1443 |
| | | | 714/43 |
| 9,298,555 B1 | 3/2016 | Ai et al. | |
| 9,367,395 B1 | 6/2016 | Bono et al. | |
| 9,558,068 B1 | 1/2017 | Bono et al. | |
| 9,842,117 B1 | 12/2017 | Zhou et al. | |
| 10,152,381 B1 | 12/2018 | Shvaiger et al. | |
| 10,235,066 B1 | 3/2019 | Chen et al. | |
| 10,528,429 B1 | 1/2020 | Vempati et al. | |
| 10,592,165 B1* | 3/2020 | Han | G06F 3/0689 |
| 2001/0049799 A1* | 12/2001 | Morita | G06F 11/1008 |
| | | | 714/6.22 |
| 2002/0038436 A1* | 3/2002 | Suzuki | G06F 11/1084 |
| | | | 714/6.12 |
| 2007/0271431 A1* | 11/2007 | Hwang | G06F 11/1471 |
| | | | 711/162 |
| 2008/0183922 A1* | 7/2008 | Sampathkumar | G06F 11/2082 |
| | | | 710/59 |
| 2012/0137173 A1* | 5/2012 | Burshan | G06F 9/45533 |
| | | | 714/15 |
| 2017/0351613 A1* | 12/2017 | Anderson | G06F 12/0868 |
| 2018/0067854 A1* | 3/2018 | Kaminski | G06F 12/123 |
| 2019/0087274 A1* | 3/2019 | Lappi | G06F 11/073 |
| 2019/0332476 A1* | 10/2019 | Zhuo | G06F 11/2094 |
| 2020/0133536 A1* | 4/2020 | Dong | G06F 3/061 |

* cited by examiner

PROCESSING A RECOVER STATE INPUT/OUTPUT REQUEST

FIELD

Embodiments of the present disclosure generally relate to a storage system, and more specifically to a storage system for reducing a data lost window in the storage system, a method and a computer readable medium.

BACKGROUND

A cache is a buffer between a bottom storage device (e.g., hard disk, or Redundant Arrays of Independent Disks RAID) and an external interface. The cache may store, for example, hot data to reduce data exchange between the external interface and a bottom drive, improve a data transmission rate and reduce delay of data access. In current RAID technology, there is a cache layer above a RAID group. When a write request is sent to the storage system from a host, the cache device stores the data in its memory and notifies the host that the input/output (I/O) is completed. The cache device may send the data to a RAID group later and may invalidate the memory after the RAID group finishes the I/O. This technology is called "WriteBack", which may improve I/O performance significantly and is used widely in storage systems. However, data loss might occur when RAID group comes back online after a hardware failure and attempts to recover data using the WriteBack technology.

SUMMARY

Embodiments of the present disclosure provide a method and apparatus for a storage system. A brief summary of embodiments is presented below to provide basic understanding of some aspects of various embodiments. The summary is not intended to identify key points of key elements or describe a scope of various embodiments. On the contrary, content described here is only intended to present some concepts in a simplified form, as a prelude to the following more detailed depictions.

A first aspect of the present disclosure provides a method for a storage system, the storage system comprising a cache device and a storage device group. The method comprises: at the cache device of the storage system, receiving an I/O request for the storage system from a host; in response to the received I/O request, determining whether predetermined conditions are satisfied; in response to determining that all the predetermined conditions are satisfied, sending a Recover State I/O request to the storage device group to allow the storage device group to return a "RECOVER NEEDED" message indicating that the storage device group is in a recover needed state. The predetermined conditions at least comprise: the storage system is just recovered from a hardware failure, and the storage device group in the storage system is in a ready but degraded state.

In some embodiments, in response to determining that at least one predetermined condition in the predetermined conditions is not satisfied, the cache device may send a normal I/O request to the storage device group.

In some other embodiments, the I/O request is a write request, and the predetermined conditions may further comprise dirty data existing in the cache device. In some embodiments, in response to receiving a RECOVER NEEDED message from the storage device group, the determination and transmission operation are performed again after a delay of a predetermined time period. In another embodiment, in response to receiving an I/O COMPLETED message from storage device group, the data in the cache device is marked as clean data.

In some embodiments, the received I/O request is a write request, and the predetermined conditions may further comprise the cache device having a sufficient storage space, and sending a Recover State I/O request to the storage device group may include: in response to all of the predetermined conditions being satisfied, writing data requested to be written by the write request into the storage space; marking the data as dirty data; and sending a Recover State write request to the storage device group. In an embodiment, in response to determining that the cache device does not have sufficient storage space, adding the received I/O request to a pending queue of the cache device.

In some other embodiments, the received I/O request is a read request, and the predetermined conditions may further comprise: target data of the read request does not exist in the cache device. In a further embodiment, in response to receiving the RECOVER NEEDED message from the storage device group, the cache device adds the received I/O request to a pending queue of the cache device. In another embodiment, in response to receiving the I/O COMPLETED message from the storage device group, the cache device sends data read from the storage device group to the host.

In some embodiments, sending the Recover State I/O request to the storage device group may comprise: determining whether the Recover State I/O request involves a plurality of stripes in the storage device group; in response to determining that the Recover State I/O request involves a plurality of stripes in the storage device group: splitting the Recover State I/O request into a plurality of Recover State I/O requests, so that each of the plurality of Recover State I/O requests only involves a single stripe in the storage device group; and sending the plurality of Recover State I/O requests to the storage device group.

A second aspect of the present disclosure provides a method for a storage system, the storage system comprising a cache device and a storage device group. The method is executed in the storage device group and comprises: receiving a Recover State I/O request from the cache device, the Recover State I/O request allowing the storage device group to return a RECOVER NEEDED message to indicate that the storage device group is in a RECOVER NEEDED state; in response to the received Recover State I/O request, determining whether predetermined conditions are satisfied, and in response to determining that the predetermined conditions are not fully satisfied, sending a message to the cache device to indicate that the Recover State I/O request is an invalid request. The predetermined conditions at least comprise: the storage device group is in a degraded state.

In some embodiments, the predetermined conditions may further comprise: the Recover State I/O request only involves a single stripe in the storage device group.

In some other embodiments, the Recover State I/O request is the Recover State read request, and the method may further comprise: in response to determining that the predetermined conditions are fully satisfied, determining whether the Recover State read request touches a degraded storage device in the storage device group; and in response to determining that the Recover State read request does not touch the degraded storage device, reading data from the storage device group; and sending the read data and I/O COMPLETED message to the cache device. In another embodiment, in response to determining that the Recover State read request touches the degraded storage device, reading data from all undegraded storage devices in the storage device group, and based on the read data, verifying whether a stripe involved by the read request in the storage device group is consistent; and in response to determining that the stripe is consistent: recovering data of the degraded storage device based on the read data; and sending the recovered data and I/O COMPLETED message to the cache device. In still another embodiment, in response to determining that the stripe is inconsistent, sending a RECOVER NEEDED message to the cache device to indicate that the storage device group is in a RECOVER NEEDED state.

In some embodiments, the Recover State I/O request is a Recover State write request, and the method may further comprise: in response to determining that the predetermined conditions are fully satisfied, reading data from all undegraded storage devices in the storage device group, and based on the read data, verifying whether a stripe involved by the write request in the storage device group is consistent; and in response to determining that the stripe is consistent: writing data to a storage device in the storage device group; marking the stripe as "REBUILD NEEDED"; and sending an I/O COMPLETED message to the cache device. In another embodiment, in response to determining that the stripe is inconsistent, sending a RECOVER NEEDED message to the cache device to indicate that the storage device group is in a RECOVER NEEDED state, and meanwhile avoiding marking the stripe as REBUILD NEEDED.

A third aspect of the present disclosure provides a storage system. The storage system comprises a cache device, a storage device group and a controller. The controller is configured to cause the cache device to execute the method in the first aspect of the present disclosure, and cause the storage device group to execute the method according to the second aspect of the present disclosure.

A fourth aspect of the present disclosure provides a computer-readable storage medium with program codes stored therein, and the program codes, when executed by a device, cause the device to execute the method according to the first aspect or the second aspect of the present disclosure.

According to the method, storage system and computer-readable medium of embodiments of the present disclosure, the cache device in the storage system can safely read data from a storage device group or write data into the storage device group using a new I/O request, when the storage device group in the storage system is in a degraded state, so that data lost window is reduced, or data loss is avoided.

Although specific embodiments are illustrated in drawings by way of example, it should be appreciated that depictions of a specific embodiment herein are not intended to limit embodiments to the disclosed specific form.

BRIEF DESCRIPTION OF THE DRAWINGS

In the disclosed content and claims below, objects, advantages and other features of the present disclosure will be made more apparent. Only for illustration purpose, non-limiting depictions of example embodiments are presented with reference to figures, in which:

DETAILED DESCRIPTION OF EMBODIMENTS

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

A lot of details are expounded in the following description for illustration purpose. However, those with ordinary skill in the art will appreciate that embodiments of the present disclosure may be implemented without these specific details. Hence, the present disclosure is not intended to be limited by the illustrated embodiments, but will be endowed the broadest scope consistent with principles and features described herein.

It should be appreciated that the terms "first", "second" and the like are only used to distinguish one element from another element. However, in fact, the first element can also be called the second element, vice versa. In addition, it should be appreciated that "comprise," "comprising," "include" and "including" are only used to illustrate existence of the stated features, elements, functions and components, and do not exclude existence of one or more other features, elements, functions or components.

Figure 1:
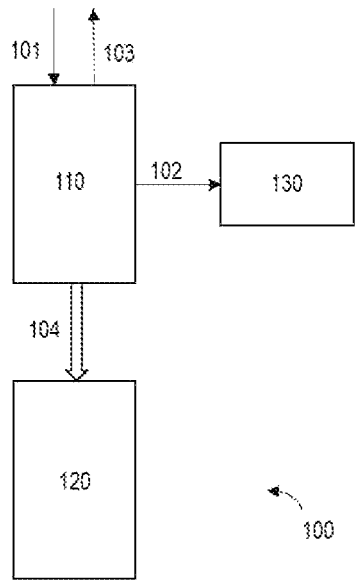
FIG. 1 illustrates a schematic block diagram of a storage system in which an embodiment of the present disclosure may be implemented.

Embodiments of the present disclosure relate to a storage system. FIG. 1 illustrates a structural schematic block diagram of a storage system 100 in which an embodiment of the present disclosure may be implemented. In this example, the storage system 100 comprises a cache device 110 and a storage device group (e.g., RAID group) 120. The cache device 110 and the storage device group 120 may perform operations under control of a controller (not shown). The controller may be located inside or outside of the storage system. Although RAID is taken as an example of the storage device in the following embodiments, it should be appreciated that embodiments of the present disclosure are not limited to the storage device in the form of a RAID.

In the storage system 100, the WriteBack technology may be used, wherein the cache device 110 receives (101) a write request from a host, writes (102) data into a memory 130 of the cache device 110, returns (103) a completion message (e.g., OK) to the host, and then clears (104) data to the storage device (e.g., RAID) 120 at background.

However, inventors of the present disclosure realize that in the case that a conventional WriteBack technology is used in the storage system, if a RAID group comes back to an online state again after a hardware failure (e.g., removal of a plurality of drives, or power failure), then the storage system might encounter a data loss, even if no new user input/output (I/O) requests arrives and failure conditions are totally cleared. Reasons that might cause the data loss will be described below One reason for the data loss is that a plurality of storage devices (e.g., disks) in the storage device group (e.g., RAID group) have different power-on time. For example, a RAID group might get broken due to a hardware failure such as removal of drives or power failure. After recovering from the hardware failure, the storage system needs to power on offline drives. Due to hardware limitations, the power-on sequence of disks in the RAID group is undetermined. For example, the disks in the RAID group may span different enclosures, and the different enclosures may be powered on at different time with an unpredictable sequence. In addition, to reduce power glitch, the same enclosure may not power on all its drives at the same time, which causes drives to power up at different time even if they are in the same enclosure. Inventors have observed that in some cases, some drive may come online 18~25 seconds later than other drives in the same RAID group. The delay may be bigger if there are more enclosures and disks.

Another reason for the data loss is that there is a constraint for offline debounce time for a logic unit number (LUN). When failure condition is cleared (power restore, drives reinserted, etc.), a RAID group will become online again. As describe above, due to different power on time of different drives, the RAID group might need to wait several seconds for drives to power on. However, there is a constraint on the waiting time. Specifically, when the RAID group is broken, LUN in this RAID group will be broken too. Then upper layer (Cache layer) will start a timer. This timer is called LUN debounce time timer. In some storage systems, this time is typically 80 seconds. If the timer expires, a host will be aware of the offline state of the storage device group and report a Data Unavailable (DU) event to customer.

With the constraint of debounce time, if not all the drives are online, the RAID group needs to come online with a degraded state after a short delay. In current implementation, it is usual to wait for 5 seconds and force the RAID group to become ready (online). At this time, if some drives in the RAID group are still offline, the RAID group is in the degraded state. The RAID group will start a rebuild after all drives come online.

Figure 2:
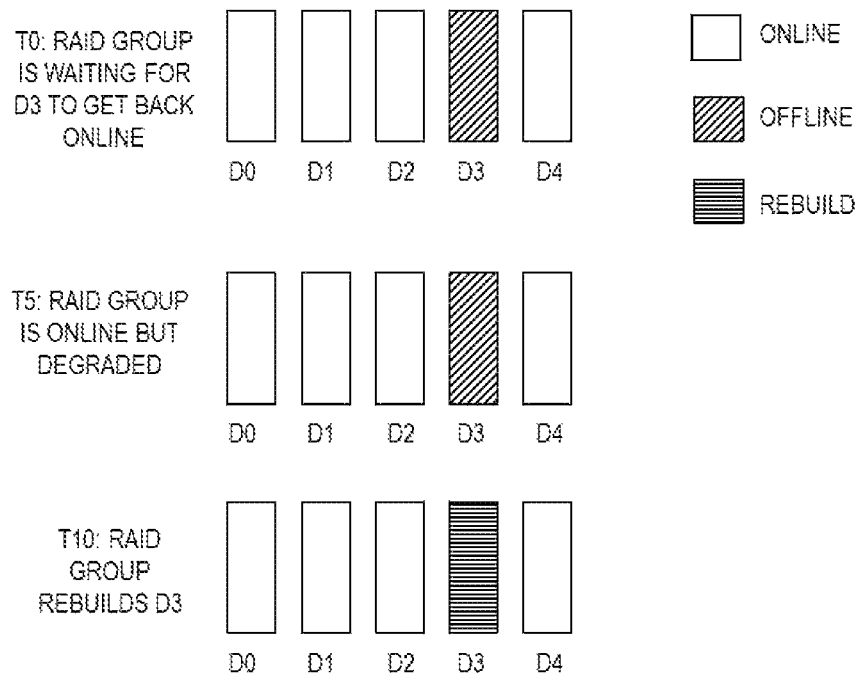
FIG. 2 illustrates state changes of a storage device group at different time.

FIG. 2 illustrates a schematic diagram of states of a RAID group 200 at different time. The RAID group in the example is RAID 5 in the form of 4+1. Assume that disk 3 (denoted as D3) is still offline after other disk gets online. D3 is awaited to return online at time T0. At time T5, for example after 5 m, D3 is still not online, the RAID group is forced to become ready. Since D3 is still offline, the RAID group is in the degraded state. At time T10, for example after 10 m, D3 becomes online, and the RAID group starts rebuilding D3.

Another reason for the data loss is incomplete write operation and background verify avoidance (BVA) state of the cache device. If an I/O from user isn't finished yet when hardware failure happens, it is likely that there are some incomplete write operations in the RAID group. Therefore, the cache device will persist the user data to another storage. In the present disclosure, the data not written into the RAID group yet is called "Dirty Data". Note that there is a battery in the storage system, and therefore, even though there is power loss, the cache device still has a chance to persist the data.

After hardware failure conditions are cleared, the RAID group will become ready again. Then the cache device needs to re-send the data to the RAID group immediately for the following reasons. First, the write request will notify the RAID group that some stripe has an error of inconsistence. However, while serving the I/O, the RAID group has no chance to verify the stripe and correct the inconsistency. In addition, the memory in the cache device is limited. Hence, the cache device needs to flush the data to free memory so as to serve other I/O request from the host. We call this technology BVA (Background Verify Avoidance). With BVA, instead of verifying the whole RAID group, the RAID group only needs to verify relevant stripe(s) when the cache device sends BVA I/Os.

Figure 3:
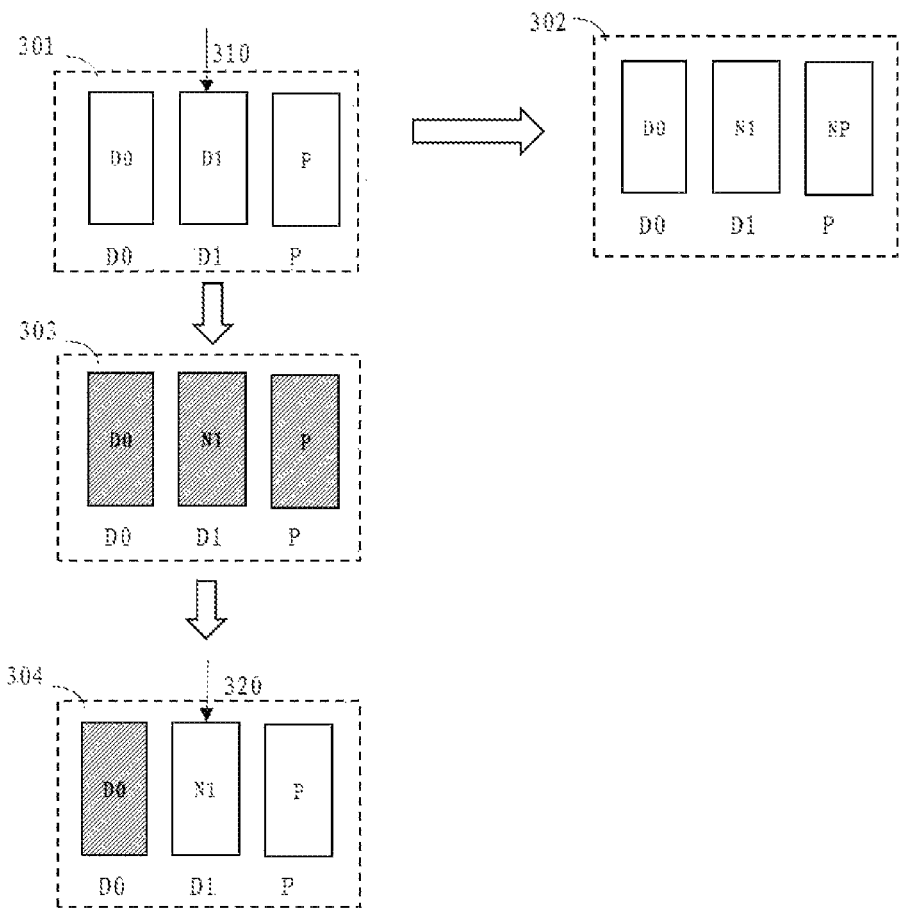
FIG. 3 illustrates a schematic diagram of an incomplete write operation.

However, as stated above, RAID group may come back online with a degraded state. If the RAID group is in the degraded state and has some stripes with incomplete write operation, BVA may cause data loss. FIG. 3 shows an example of a possible scenario.

Block 301 of FIG. 3 shows a state before the RAID group receives an I/O request. At this time, disk 0 (denoted as D0), disk 1 (denoted as D1) and a parity disk (denoted as P) all have old data and have consistency, and for example satisfy a parity relationship of P=D0 xor D1, wherein xor is an exclusive-or operation. Then, the user writes (310) data to D1. RAID group updates D1 and the parity disk P. In a normal case, if the update is completed smoothly, D1 and P are updated as N1 and NP, and the RAID group will reach a new consistent state as shown in block 302, for example, NP=D0 xor N1. However, if power fails when data is successfully written into D1 but not written into the parity disk P, an incomplete write on the stripe across D0, D1 and the parity disk P occurs. That is, D1 contains new data, but parity disk P contains old data, as shown in block 303 of FIG. 3.

In this example, when power failure happens, the user I/O is not finished yet. So the cache device stores the data to another storage. After power restores, D0 is not back online yet, and therefore the RAID group becomes ready with a degraded state, as shown in block 304 of FIG. 3. Since the RAID group is ready, the cache device attempts to re-write (320) the data to RAID group immediately.

If both of D1 and the parity disk P have new data or old data, the RAID group may recover data in D0 correctly.

However, if D1 has new data and the parity disk P has old data (namely, inconsistent), the recovered data is invalid. The RAID group finds that D1 and parity disk P have inconsistent data (for example, P!=D0 xor N1, wherein "!=" represents unequal to) and D0 is degraded. This means that it is impossible to recover data in D0. Therefore, RAID group writes new data to D1 and sets data of D0 to a Data Lost pattern. Several seconds later, all failure conditions are cleared and D0 returns to an available state, parity disk P rebuilds D0 with the Data Lost pattern. However, the rebuilding cannot succeed, namely, data in D0 cannot be recovered, and D0!=P xor N1.

Therefore, as shown in the example of FIG. 3, in some cases, although user data does not involve D0 and all hard disk failure is cleared, data loss in D0 might still occur. The data loss is caused by incomplete write in other disk(s).

To solve above and other potential problems, embodiments of the present disclosure introduce a new I/O operation for safe read/write, to avoid data loss. The new I/O operation proposed in the present disclosure is called a Recover State I/O hereafter, to distinguish from a conventional I/O. The Recover State I/O includes Recover State Read (or briefly called Recover Read) and Recover State Write (or briefly called Recover Write).

Like the conventional read operation, the cache device uses the Recover State Read operation to read data from a RAID group; however, differently, the Recover State Read operation allows the RAID group to return a "RECOVER NEEDED" message to indicate that the RAID group is in a recover needed state, to fail the I/O request.

In addition, like the conventional write operation, the cache device uses this Recover State Write operation to write data into RAID group; however, differently, the Recover State Write operation allows the RAID group to return a "RECOVER NEEDED" message to indicate that the RAID group is in a recover needed state, to fail the I/O request. If the RAID group returns the "RECOVER NEEDED" message, the RAID group guarantees that no media modification operations are sent to disks that needs recovering.

The proposed Recover State I/O may be used internally between the cache device and the storage device group (e.g., RAID group), but it may also be executed between the host and the cache device. In embodiments of the present disclosure, as an example, behaviors of using the proposed new I/O operation between the cache device and the RAID group are described. In this example, the cache device and the RAID group work together to support these newly-proposed I/O operations, wherein the cache device is an initiator of the Recover State I/O request and the RAID group is a receiver. However, it should be appreciated that principle of the present disclosure may be applied to other proper scenarios.

Figure 4:
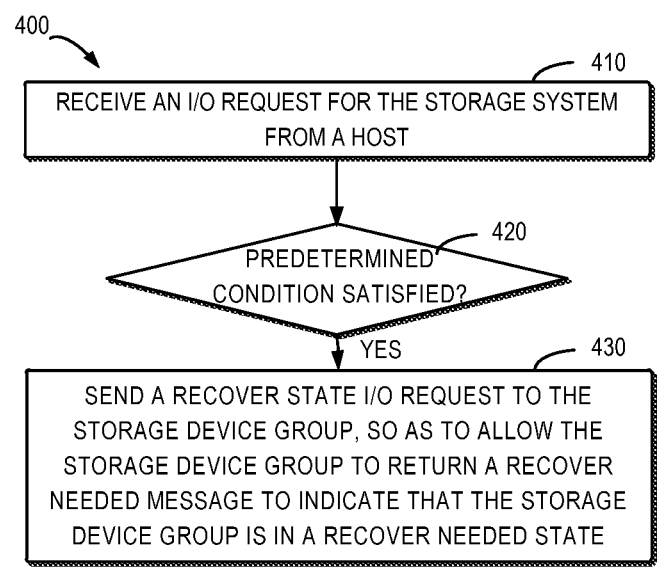
FIG. 4 illustrates a flow chart of a method of sending an I/O request to a storage device group at a cache device of a storage system according to an embodiment of the present disclosure.

FIG. 4 illustrates an example flow chart of a method 400 for a storage system according to an embodiment of the present disclosure. The storage system comprises the cache device and the storage device group. For example, the storage system may be the system 100 shown in FIG. 1. The method is executed by the cache device (e.g., the cache device 110 in FIG. 1). To facilitate discussion, the method will be described with reference to the storage system 100 shown in FIG. 1. However, it should be appreciated that embodiments of the present disclosure are not limited thereto.

As shown in FIG. 4, at block 410, the cache device 110 receives from the host the I/O request for the storage system 100. Different from the conventional WriteBack technology, the cache device 110 does not directly send the I/O request to the storage device group 120, but determines (or ascertains) at block 420 whether a set of predetermined conditions are satisfied; furthermore, at block 430, in response to determining that all the predetermined conditions are satisfied, sends a Recover State I/O request other than a conventional I/O request to the storage device group 120 (e.g., a RAID group). The Recover State I/O request allows the storage device group 120 to return a "RECOVER NEEDED" message to indicate that the storage device group is in a recover needed state. In accordance with certain embodiments, block 420 only proceeds to block 430 when all of the predetermined conditions are satisfied.

The predetermined conditions at least comprise: (1) the storage system is just recovered from a hardware failure; and (2) the storage device group 120 in the storage system is in a ready but degraded state.

In some embodiments, upon determining (or discovering) that at least one predetermined condition in the predetermined conditions is not satisfied, the cache device 110 may not send the Recover State I/O request to the storage device group 120, but for example send a normal I/O request (namely, a conventional I/O request) to the storage device group 120. However, embodiments of the present disclosure are not limited thereto.

Description will be given respectively to embodiments in which the I/O request received at block 410 is a write request and a read request.

In some embodiments, the I/O request received at block 410 is a write request. Further, the predetermined conditions further comprise: (3) there is 'Dirty Data' in the cache device. In this embodiment, at block 430, in response to determining that conditions (1), (2) and (3) are all satisfied, the cache device 110 may send a Recover State Write request to the storage device group 120. That is to say, only when there is dirty data in the cache device 110 is the Recover State Write request sent, to write data into the storage device group 120.

Alternatively or additionally, in another embodiment, the I/O request received at block 410 is a write request. Further, the predetermined conditions further include: (4) the cache device has enough storage space. In this embodiment, at block 430, in response to determining that conditions (1), (2) and (4) are all satisfied, the cache device 110 may perform the following operations: writing data requested to be written by the write request into a memory (e.g., memory 130 in FIG. 1) in the cache device 110; marking the data as dirty data; and sending the Recover State write request to the storage device group 120.

Optionally, in another embodiment, at block 430, in response to determining that conditions (1) and (2) are both satisfied but condition (4) is not satisfied (namely, the cache device 110 does not have sufficient memory), the cache device 110 may add the I/O request received at the block 410 to a pending queue of the cache device 110.

Figure 5:
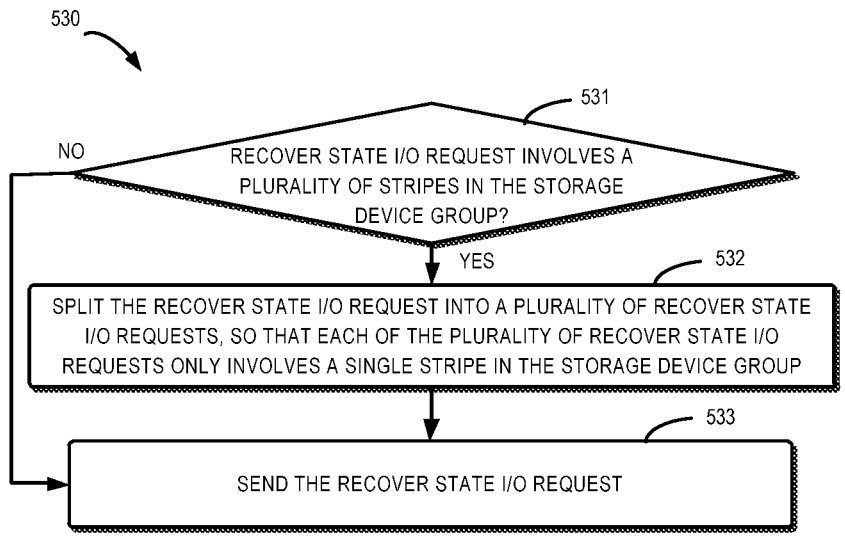
FIG. 5 illustrates a flow chart of an example implementation of the sending operation of FIG. 4 according to an embodiment of the present disclosure.

Alternatively or additionally, in some embodiments, before the Recover State I/O request is sent to the storage device group 120, the cache device 110 may process the Recover State I/O request to make it only involve a single stripe in the storage device group 120. FIG. 5 shows a plurality of operations 530 that may be implemented at block 430 in some embodiments.

As shown in FIG. 5, at block 531, the cache device 110 may determine whether the Recover State I/O request involves a plurality of stripes in the storage device group 120. At block 532, in response to determining that the Recover State I/O request involves a plurality of stripes in the storage device group, the cache device 110 splits the Recover State I/O request into a plurality of Recover State I/O requests so that each of the plurality of Recover State I/O requests only involves a single stripe in the storage device group 120. At block 533, the cache device 110 sends the plurality of Recover State I/O requests to the storage device group. It should be appreciated that if it is determined at block 531 that the Recover State I/O request only involves a single stripe in the storage device group, it may directly send the Recover State I/O request without executing the splitting operation in block 532. Note that the example of FIG. 5 is applicable to both the case where the I/O request is a write request and the case where the I/O request is a read request.

Figure 6:
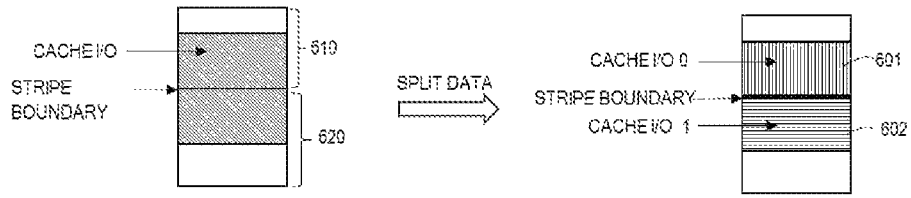
FIG. 6 illustrates an example of splitting an I/O request according to an embodiment of the present disclosure.

FIG. 6 shows an example of I/O splitting that may be used at block 532 according to an embodiment of the present disclosure. In this example, the I/O request is a write request, the stripe of RAID group has a size of 2M bytes, a starting address of data involved by the I/O request is located at 1M byte, and the size of the data is 2M bytes. In this case, as shown in FIG. 6, the I/O request will involve two stripes 610 and 620, namely, the dirty data is not in a scope of a single stripe. Hence, the cache device 110 may split the I/O request into a plurality of I/O. In this example, the cache device 110 splits the I/O into two I/Os, 601 and 602, according to a boundary of the stripe. The first I/O 601 has a starting address of 1M bytes and a size of 1M bytes, while the second I/O 602 has a starting address of 2M bytes and a size of 1M bytes. In this way, the size of data involved by the I/O operation is limited within the scope of a single stripe in the RAID group, thereby simplifying the verification operations performed in the storage device group.

Figure 7:
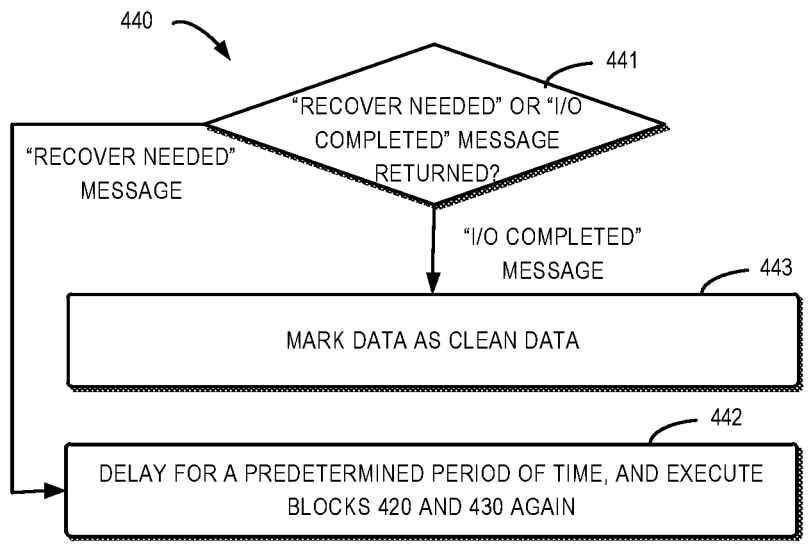
FIG. 7 illustrates a flow chart of operations that may be further included in the method of FIG. 4 according to an embodiment of the present disclosure.

Now referring to FIG. 4 again. In an embodiment in which the I/O request received at block 410 is a write request, the method 400 may comprise further operations to cause the cache device 110 to perform different processing according to different messages returned from the storage device group 120. As an example, FIG. 7 shows an example 440 of the further operations of the cache device 110. In this example, at block 441, the cache device 110 receives a feedback message from the storage device group 120, and determines a message type; at block 442, in response to the message returned from the storage device group 120 being a "RECOVER NEEDED" message, and after a delay of a predetermined time period, the cache device 110 performs the operations of determination in block 420 and transmission in block 430 again.

In another example shown in FIG. 7, at block 443, in response to the message returned from the storage device group 120 being an "I/O COMPLETED" message, the cache device 110 marks its data as clean data.

Returning to FIG. 4. In some embodiments, the I/O request received at block 410 is a read request, and the predetermined conditions further include: (5) target data of the read request does not exist in the cache device 110. At block 430, in response to determining that conditions (1), (2) and (5) are all satisfied (namely, the target data of the read request does not exist in the cache device 110, or the I/O request is a cache-miss read request), the cache device 110 may send the Recover State read request to the storage device group 120.

Similar to the example of FIG. 7, in some embodiments in which the I/O request received at block 410 is a read request, the method 400 may comprise further operations so that the cache device 110 may perform different processing according to different messages returned from the storage device group 120. As an example, the method 400 may further comprise: in response to the "RECOVER NEEDED" message returned from the storage device group 120, the cache device 110 adding the I/O request received at block 410 to the pending queue of the cache device 110. Alternatively or additionally, in another embodiment, the method 400 may further comprise: in response to the "I/O COMPLETED" message returned from the storage device group 120, the cache device 110 sending data read from the storage device group 120 to the host.

Figure 8:
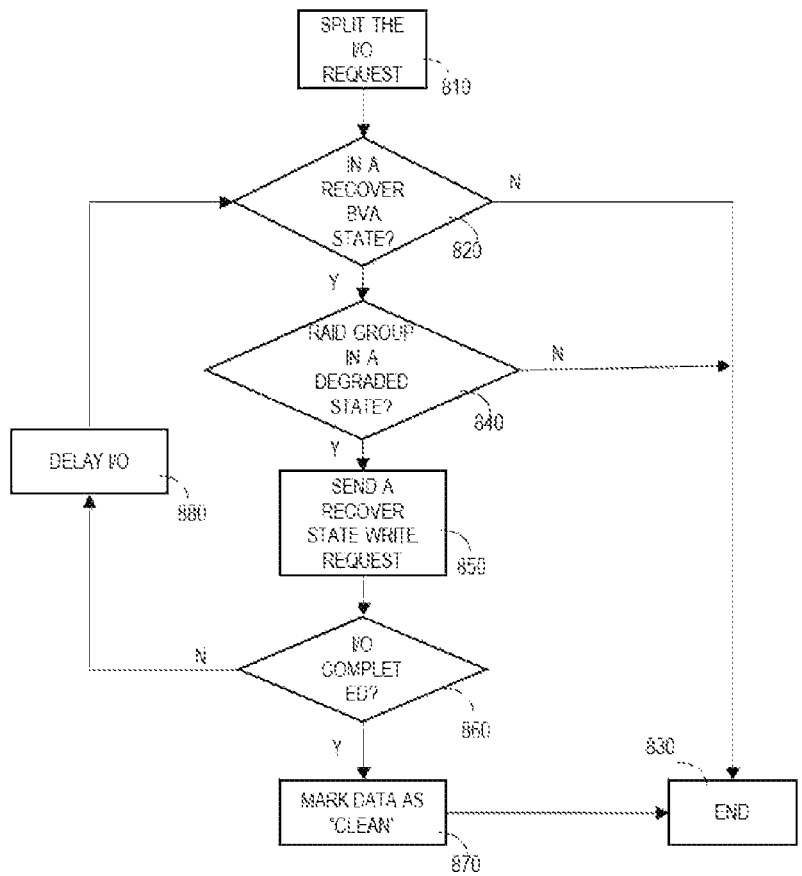
FIG. 8 illustrates a flow chart of another method of sending an I/O request to a storage device group at a cache device of a storage system according to an embodiment of the present disclosure.

FIG. 8 illustrates another method 800 for a storage system according to an embodiment of the present disclosure. The storage system comprises a cache device and a storage device group. For example, the storage system may be the system 100 shown in FIG. 1. The method is executed by the cache device (e.g., the cache device 110 in FIG. 1). The method 800 may be considered as an example implementation of method 400. To facilitate discussion, the method 800 will be described below with reference to the storage system 100 shown in FIG. 1. However, it should be appreciated that embodiments of the present disclosure are not limited thereto.

In the example of FIG. 8, when the storage device group (e.g., RAID group) becomes ready, the cache device 110 checks whether the storage device group 120 is in a degraded state. If the storage device group 120 is not in the degraded state or the cache device 110 does not include dirty data, a special operation is not performed in the cache device 110. Otherwise, the cache device 110 may use the new I/O operation (Recover State write) proposed by the present disclosure to flush the dirty data to the storage device group 120. Furthermore, at this time, the state which the cache device enters is called a recover BVA state. In this state, the cache device 110 may flush the dirty data according to the procedure shown in FIG. 8.

Specifically, at block 810, the cache device 110 splits the Recover State I/O request to ensure that a single Recover State I/O request fits in a stripe scope of the RAID group. At block 820, the cache device determines whether it is in the recover BVA state (namely, the storage device group 120 is in the degraded state, and the cache device 110 includes dirty data). If the cache device is not in the recover BVA state, the procedures ends at block 830; otherwise, the cache device 110 may optionally determine at block 840 whether the storage device group 120 is still in the degraded state. If it is determined that the storage device group 120 is out of the degraded state, the procedure ends at block 830. Then, the cache device 110 may for example perform a write operation to flush data according to the conventional I/O (namely, normal I/O procedure). If it is determined at block 840 that the storage device group 120 is still in the degraded state, the cache device 110 sends a Recover State write request to the storage device group 120 at block 850.

At block 860, the cache device 110 determines whether a good state, namely an I/O COMPLETED message, is returned from the storage device group 120. If it is determined that the I/O is completed, it means that the RAID group 120 already recovers the stripe and the dirty data is already written. In this case, the cache device 110 marks the data as clean data at block 870, and the procedure ends at block 830. If the storage device group 120 does not return a good state, but returns for example a "RECOVER NEEDED" message, it means that inconsistency exists in the stripe of the storage device group 120, and some data are not recovered by the storage device group 120. In this case, the cache device 110 may delay the I/O for a time period (e.g., 100 ms to 3 m) at block 880, and then the flow returns to block 820 for further attempt.

A method of safely performing I/O through the newly-proposed I/O operation (Recover State write and Recover State read) at the cache device so as to avoid data loss has been described above with reference to a plurality of embodiments. In some embodiments, when in the Recover State, if the cache device includes sufficient memory, the data may be copied to the memory and OK is returned to the host. The data will be marked as dirty data, and subsequently the cache device may use the recover write operation to flush the data to the RAID group. If the cache device does not include sufficient memory, it may make the I/O wait in the waiting queue of the cache device. In some other embodiments, the cache device receives the read request. The target data of the read request is not matched in the cache device, the cache device may send the I/O to the RAID group using the recover read request. If the message returned from the RAID group indicates a good state (namely, I/O COMPLETED), the cache device returns data to the host. If the message returned from the RAID group indicates RECOVER NEEDED, the cache device may make the I/O wait in the waiting queue.

It should be noted that the recover BVA state of the cache device is a temporary state. If no host I/O is sent to the cache device and the cache device fails to successfully flush all dirty data, the cache device will be kept in this state. When any of the following conditions is satisfied, the cache device will leave this state: the offline drives come back again, pending queue of the cache device is not empty (which means there are pending host I/Os), and the LUN debounce timer expires. Upon leaving this state, cache device may fall back to, for example, a conventional implementation to process pending I/O and dirty data. However, embodiments of the present disclosure are not limited thereto.

Figure 9:
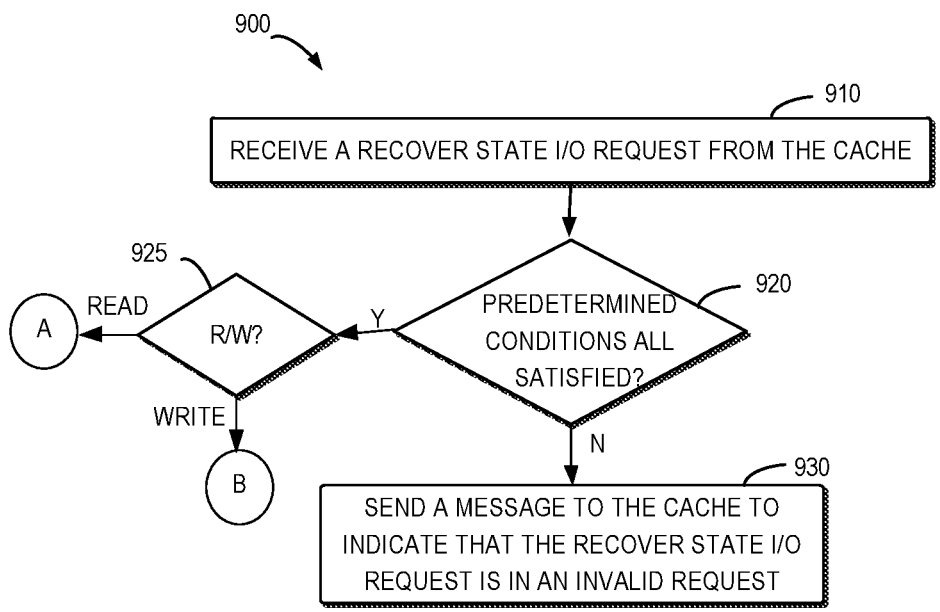
FIG. 9 illustrates a flow chart of a method of processing an I/O request from a cache device at a storage device group of a storage system according to an embodiment of the present disclosure.

Reference is made below to FIG. 9 to describe a method 900 at the storage device group in the storage system according to an embodiment of the present disclosure. The storage system comprises a cache device and the storage device group. For example, the storage system may be the system 100 shown in FIG. 1. The storage device group may be for example the storage device group 120 in FIG. 1, and may be (but is not limited to) the RAID group. To facilitate discussion, the method will be described below with reference to the storage system 100 shown in FIG. 1. However, it should be appreciated that embodiments of the present disclosure are not limited thereto.

As shown in FIG. 9, at block 910, the cache device 120 receives a Recover State I/O request from the cache device 110. The Recover State I/O request may be, for example, a Recover State read request or a Recover State write request. As described with reference to methods 400 and 800, different from the conventional I/O request, the Recover State I/O request allows the storage device group 120 to return the RECOVER NEEDED message to indicate that it is in the RECOVER NEEDED state.

At block 920, in response to the received Recover State I/O request, the storage device group 120 determines whether predetermined conditions are satisfied. The predetermined conditions at least comprise: it itself is in a degraded state. The degraded state is for example caused by an offline state of one or more disks in the storage device group 120. At block 930, in response to determining that the predetermined conditions are not fully satisfied (e.g., the storage device group 120 is not in the degraded state), the storage device group 120 returns a message to the cache device 110 to indicate that the Recover State I/O request is an invalid request.

The method enables to process the new I/O operation only when the predetermined conditions are satisfied (e.g., the storage device group is in the degraded state).

In some embodiments, for example, to enable use of the BVA technology in the storage device group 120, the storage device group 120 may require the received I/O request to only involve a single stripe in the storage device group 120. Hence, in some embodiments, the predetermined conditions further comprise: the received Recover State I/O request only involves a single stripe in the storage device group. For example, at block 930, in response to the received Recover State I/O request involving a plurality of stripes in the storage device group 120, the storage device group 120 may return a message to the cache device 110 to indicate that the Recover State I/O request is an invalid request.

When it is determined at block 920 that the predetermined conditions are fully satisfied, the storage device group 120 may determine at block 925 whether the received Recover State I/O request is a read request or a write request, and perform different operations (e.g., denoted by branches A and B in FIG. 9) according to the determination.

Figure 10:
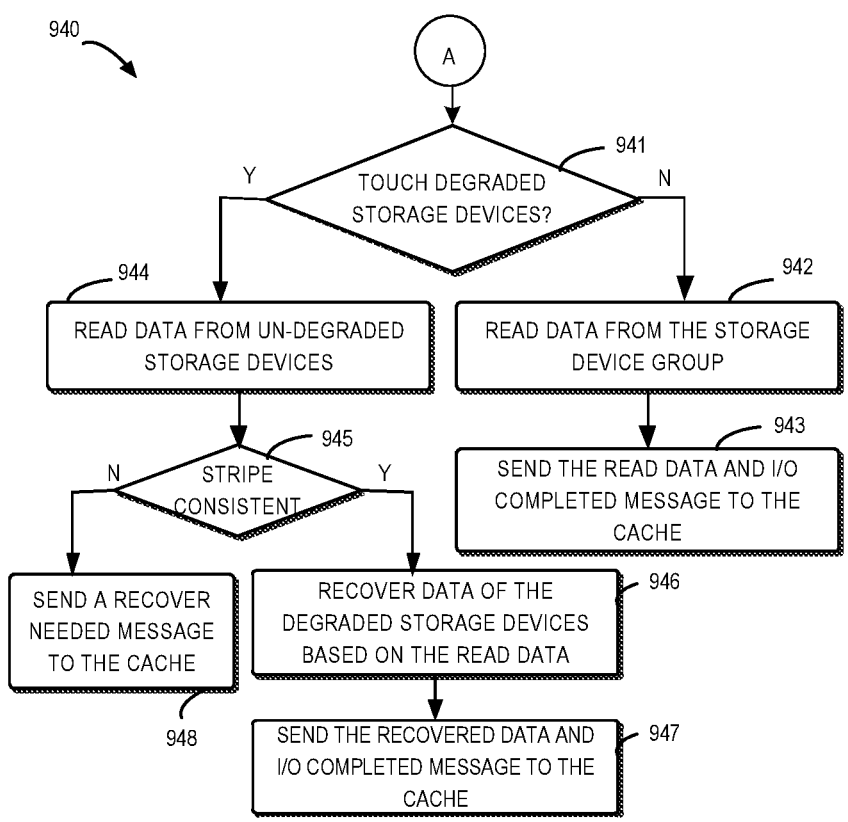
FIG. 10 and FIG. 11 respectively illustrate a flow chart of a method of processing a valid Recover State read request and a Recover State write request at a storage device group of a storage system according to an embodiment of the present disclosure.

In some embodiments, it is determined at block 925 that the I/O request is the Recover State read request. In this case, as an example, the storage device group 120 may perform the operation 940 in FIG. 10. However, it should be appreciated that the storage device group 120 is not limited to processing the Recover State read request in a specific implementation shown in FIG. 10. In the example of FIG. 10, at block 941, the storage device group 120 determines whether the received Recover State read request touches a degraded storage device in the storage device group 120. In response to determining that the Recover State read request does not touch the degraded storage device, the storage device group 120 may directly read data at block 942, and at block 943 send the read data and an I/O COMPLETED message to the cache device 110.

In another aspect, in response to determining at block 941 that the Recover State read request touches the degraded storage device, the storage device group 120, at block 944, reads data from all un-degraded storage devices therein. At block 945, based on the read data, verify whether the stripe(s) targeted at by the read request in the storage device group 120 is consistent (namely, whether there is incomplete write in it).

If it is determined at block 945 that the stripe is consistent, at block 946 the storage device group 120 may recover data of the degraded storage device based on the read data, and at block 947 sends the recovered data and I/O COMPLETED message to the cache device 110. On the other hand, in response to determining that the stripe is inconsistent at block 945, the storage device group 120 may return the RECOVER NEEDED message to the cache device 110 at block 948.

Figure 11:
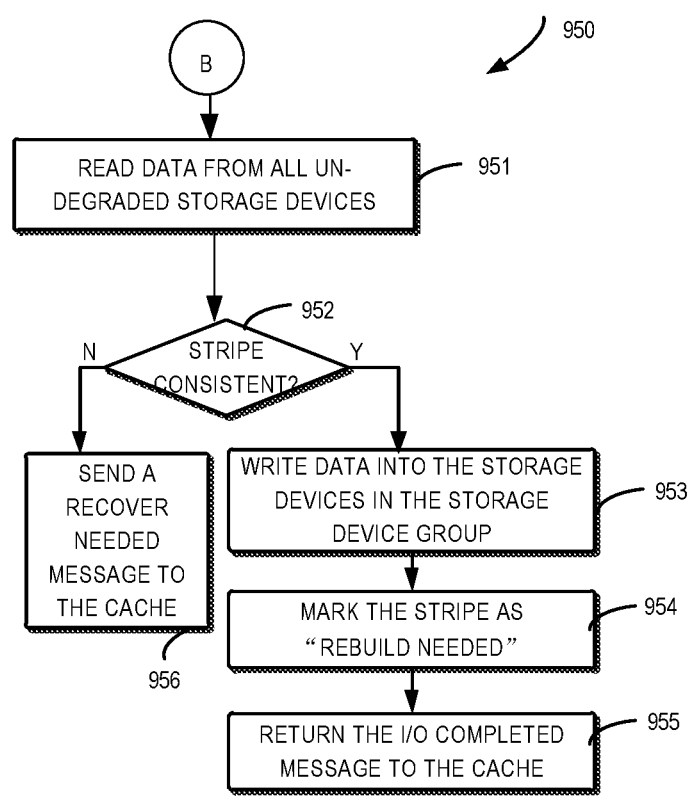

In some embodiments, it is determined at block 925 that the received I/O request is a Recover State write request. In this case, as an example, the storage device group 120 may perform the operation 950 in FIG. 11. However, it should be appreciated that the storage device group 120 is not limited to processing the Recover State write request in the specific implementation shown in FIG. 11. In the example shown in FIG. 11, at block 951 the storage device group 120 reads data from all un-degraded storage devices. At block 952, based on the read data, verify whether the stripe targeted at by the write request in the storage device group 120 is consistent (namely, whether there is incomplete write in it). At block 953, in response to determining that the stripe is consistent, the storage device group 120 writes data to the storage devices therein. At block 954, the storage device group 120 marks the stripe as "REBUILD NEEDED", and at block 955, returns I/O COMPLETED message to the cache device 110.

On the other hand, in response to determining that the stripe is inconsistent (namely, there is incomplete write which causes a condition where some disks have new data and some disks have old data) at block 952, the storage device group 120 may return "RECOVER NEEDED" message to the cache device 110 at block 956, and meanwhile avoid marking the stripe as "REBUILD NEEDED". A reason for avoiding marking the stripe as "REBUILD NEEDED" is that marking the stripe as "REBUILD NEEDED" will cause the sending of the write operation code to the disk, and causes data loss as shown in FIG. 3. In the embodiment of the present disclosure, the newly-proposed Recover State write operation ensures that media modification operation will not occur when the "RECOVER NEEDED" state is returned, thereby avoiding data loss.

Figure 12:
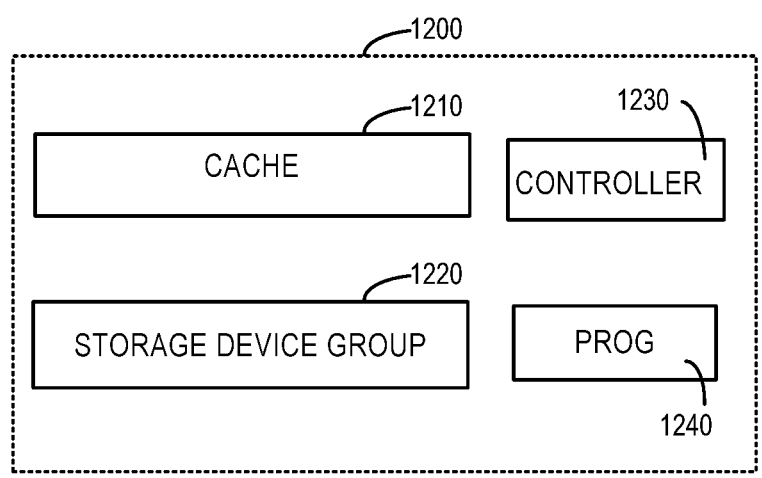
FIG. 12 illustrates a schematic structural diagram of a storage system according to an embodiment of the present disclosure.

Reference is made below to FIG. 12 to describe a structure of an example storage system 1200 according to an embodiment of the present disclosure. The storage system 1200 comprises a cache device 1210, a storage device group 1220 and a controller 1230. The controller 1230 may be configured to cause the cache device 1210 to perform the method according to an embodiment of the present disclosure, for example method 400 or 800. Furthermore, the controller 1230 may be configured to cause the storage device group 120 to execute the method according to an embodiment of the present disclosure, e.g., the method 900. Although FIG. 12 only shows a single cache device, storage device group and controller, it should be appreciated that the storage system 1200 may comprise any number of above-mentioned devices. For example, the storage system 1220 may include a plurality of controllers 1230 which respectively control operations of the cache device 1210 and storage device group 1220 to perform partial or all operations of method 400/800/900. In some embodiments, the controller 1230 may be coupled to the cache device 1210 and/or storage device group 1220. In some other embodiments, the controller 1230 may serve as a portion of the cache device 1210 or storage device group 1230.

The controller 1230 may perform various proper actions and processing by uploading/running a computer program instruction 1240. For example, the computer program instruction 1240 may include operation codes for supporting the new I/O request and response proposed by embodiments of the present disclosure, causing the cache device 1210 to execute method 400 or 800, and/or causing the storage device group 1220 to execute the method 900. The controller 1230 may include but is not limited to a digital signal processor (DSP), a network processor, an application-specific integrated circuit (ASIC), a field programmable gate array (FPGA) and the like.

Embodiments of the present disclosure may be used to reduce Data Lost window, and reduce or avoid data loss. In some embodiments, a new I/O operation is proposed to perform safe read/write when the RAID group becomes ready and some disks therein are offline. In addition, some embodiments of the present disclosure may be implemented in the current RAID technology, namely, can be used in combination with the current RAID technology.

It should be appreciated that although operations in some embodiments have been described in a specific order, this should not be understood as requiring such operations to be completed in the shown specific order or sequentially in order, or requiring all illustrated operations to be performed to obtain a desired result. For example, the order of a plurality of determining operations (e.g., operations at blocks 820 and 840) in FIG. 8 may be interchangeable. In addition, in some cases, multi-task and parallel processing may be advantageous. Likewise, although the above discussion contains some specific implementation details, this should not be understood as limiting the scope of any invention or claim, but should be construed as depictions of a specific embodiment of a specific invention. Some features described in the context of separate embodiments of the present disclosure may be integrated and implemented in a single embodiment. Conversely, various features described in the context of a single embodiment may be separately implemented in a plurality of embodiments or any suitable sub-combinations.

In addition, those skilled in the art can easily appreciate that blocks or operations in the above methods may be executed by a programmed computer. In the present disclosure, some embodiments are intended to cover a program storage system such as a digital data storage medium, which stores program instructions that are machine or computer-readable and may be executed by an encoded machine or a computer, wherein the instruction executes some or all steps of the above methods. The program storage system may be for example a digital memory, a magnetic storage medium such as a magnetic disk or magnetic tape, a hard disk driver or optically-readable digital data storage medium. Embodiments are further intended to cover a computer programmed to execute steps of the above method.

For example, in some embodiments, there is provided a computer-readable storage medium. The computer-readable storage medium stores computer codes therein, and the program codes, when executed by a device (e.g., the cache device 110 in FIG. 1, or cache device 1210 in FIG. 12, or a combination of the cache device 1210 and controller 1230 in FIG. 12), cause the device to execute the method according to embodiments of the present disclosure, for example, method 400 or 800. For example, the program for supporting the I/O operation newly proposed in the present disclosure may be stored in the computer-readable medium as new I/O operation codes, and the cache device 1210 may invoke the operation code to execute the method 400 or 800. Similarly, the storage device group 1220 may individually invoke the operation code to execute the method 900.

In some other embodiments, there is provided a computer-readable storage medium. The computer-readable storage medium stores computer codes therein, which when executed by a device (e.g., the storage device group 110 in FIG. 1, or storage device group 1220 in FIG. 12, or a combination of the storage device group 1220 and controller 1230 in FIG. 10), cause the device to execute the method according to embodiments of the present disclosure, for example, method 900.

In addition, those skilled in the art should appreciate that the description and figures are only intended to illustrate the principle of the present disclosure. Hence, it should be appreciated that those skilled in the art can design various arrangements, though not explicitly described or shown herein, reflecting principles of the present disclosure and are included in the spirit and scope of the present disclosure. Besides, all examples illustrated herein are mainly intended explicitly for teaching purposes so as to help readers to understand the principle of the embodiments of the present disclosure and the concepts contributed by the inventors for advancing the field, and should be interpreted as not being limited by instances and conditions specifically elaborated herein. Meanwhile, all statements describing principles, aspects and embodiments of the present disclosure also intend to include also their equivalents.

We claim:

1. A method for a storage system, comprising:
at a cache device of the storage system,
   receiving an input/output (I/O) request for the storage system from a host;
in response to the received I/O request,
   determining whether predetermined conditions are satisfied, the predetermined conditions at least comprising:
      the storage system being just recovered from a hardware failure, and
      a storage device group in the storage system being in a ready but degraded state;
   in response to determining that all the predetermined conditions are satisfied, sending a Recover State I/O request to the storage device group, so as to allow the storage device group to return a RECOVER NEEDED message indicating that the storage device group is in a recover needed state; and
   in response to receiving the RECOVER NEEDED message from the storage device group, adding the received I/O request to a pending queue of the cache device.

2. The method according to claim 1, further comprising:
in response to determining that at least one of the predetermined conditions is not satisfied, sending a normal I/O request to the storage device group.

3. The method according to claim 1, wherein the I/O request is a write request, and the predetermined conditions further comprise: dirty data existing in the cache device.

4. The method according to claim 3, further comprising:
in response to receiving the RECOVER NEEDED message from the storage device group, performing the determining and the sending again after a delay of a predetermined time period.

5. The method according to claim 3, further comprising:
in response to receiving an I/O COMPLETED message from the storage device group, marking data in the cache device as clean data.

6. The method according to claim 1, wherein the received I/O request is a write request, and the predetermined conditions further comprise: the cache device having a sufficient storage space, and
wherein sending a Recover State I/O request to the storage device group comprises:
   in response to all of the predetermined conditions being satisfied,
      writing data requested to be written by the write request into the storage space;
      marking the data as dirty data; and
      sending a Recover State write request to the storage device group.

7. The method according to claim 1, wherein the received I/O request is a read request, and the predetermined conditions further comprise: target data of the read request being absent from the cache device.

8. A method for a storage system, comprising:
at a cache device of the storage system,
   receiving an input/output (I/O) request for the storage system from a host;
in response to the received I/O request,
   determining whether predetermined conditions are satisfied, the predetermined conditions at least comprising:
      the storage system being just recovered from a hardware failure, and
      a storage device group in the storage system being in a ready but degraded state; and
   in response to determining that all the predetermined conditions are satisfied, sending a Recover State I/O request to the storage device group, so as to allow the storage device group to return a RECOVER NEEDED message indicating that the storage device group is in a recover needed state;
wherein the received I/O request is a write request, and the predetermined conditions further comprise: the cache device having a sufficient storage space,
wherein sending a Recover State I/O request to the storage device group comprises:
   in response to all of the predetermined conditions being satisfied,
      writing data requested to be written by the write request into the storage space;
      marking the data as dirty data; and
      sending a Recover State write request to the storage device group; and
wherein the method further comprises:
   in response to determining that the cache device having an insufficient storage space, adding the received I/O request to a pending queue of the cache device.

9. A method for a storage system, comprising:
at a cache device of the storage system,
   receiving an input/output (I/O) request for the storage system from a host;
in response to the received I/O request,
   determining whether predetermined conditions are satisfied, the predetermined conditions at least comprising:
      the storage system being just recovered from a hardware failure, and
a storage device group in the storage system being in a ready but degraded state;
in response to determining that all the predetermined conditions are satisfied, sending a Recover State I/O request to the storage device group, so as to allow the storage device group to return a RECOVER NEEDED message indicating that the storage device group is in a recover needed state; and
in response to receiving an I/O COMPLETED message from the storage device group, sending data read from the storage device group to the host.

10. A method for a storage system, comprising:
at a cache device of the storage system,
   receiving an input/output (I/O) request for the storage system from a host;
in response to the received I/O request,
   determining whether predetermined conditions are satisfied, the predetermined conditions at least comprising:
      the storage system being just recovered from a hardware failure, and
      a storage device group in the storage system being in a ready but degraded state; and
   in response to determining that all the predetermined conditions are satisfied, sending a Recover State I/O request to the storage device group, so as to allow the storage device group to return a RECOVER NEEDED message indicating that the storage device group is in a recover needed state; and
wherein sending the Recover State I/O request to the storage device group comprises:

determining whether the Recover State I/O request involves a plurality of stripes in the storage device group;

in response to determining that the receive state I/O request involves a plurality of stripes in the storage device group, splitting the Recover State I/O request into a plurality of Recover State I/O requests, so that each of the plurality of Recover State I/O requests only involves a single stripe in the storage device group, and sending the plurality of Recover State I/O requests to the storage device group.

11. A method for a storage system, comprising:

at a storage device group of the storage system, receiving a Recover State input/output (I/O) request from a cache device of the storage system, the Recover State I/O request allowing the storage device group to return a RECOVER NEEDED message indicating that the storage device group is in a RECOVER NEEDED state;

in response to the received Recover State I/O request, determining whether predetermined conditions are satisfied, the predetermined conditions at least comprising the storage device group being in a degraded state; and in response to determining that the predetermined conditions are not fully satisfied, sending a message to the cache device to indicate that the Recover State I/O request is an invalid request.

12. The method according to claim 11, wherein the predetermined conditions further comprise: the Recover State I/O request only involves a single stripe in the storage device group.

13. The method according to claim 12, wherein the Recover State I/O request is a Recover State read request, and the method further comprises:

in response to determining that the predetermined conditions are fully satisfied, determining whether the Recover State read request touches a degraded storage device in the storage device group; and in response to determining that the Recover State read request does not touch the degraded storage device, reading data from the storage device group, and sending the read data and an I/O COMPLETED message to the cache device.

14. The method according to claim 13, further comprising:

in response to determining that the Recover State read request touches the degraded storage device, reading data from all un-degraded storage devices in the storage device group, based on the read data, verifying whether a stripe involved by the read request in the storage device group is consistent; and in response to determining that the stripe is consistent:

recovering data of the degraded storage device based on the read data, and sending the recovered data and an I/O COMPLETED message to the cache device.

15. The method according to claim 14, further comprising:

in response to determining that the stripe is inconsistent, sending a RECOVER NEEDED message to the cache device to indicate that the storage device group is in a recover needed state.

16. The method according to claim 12, wherein the Recover State I/O request is a Recover State write request, and the method further comprises:

in response to determining that the predetermined conditions are fully satisfied, reading data from all un-degraded storage devices in the storage device group, based on the read data, verifying whether a stripe involved by the write request in the storage device group is consistent; and in response to determining that the stripe is consistent, writing data to the storage devices in the storage device group, marking the stripe as REBUILD NEEDED, and sending an I/O COMPLETED message to the cache device.

17. The method according to claim 16, further comprising:

in response to determining that the stripe is inconsistent, sending a RECOVER NEEDED message to the cache device to indicate that the storage device group is in a recover needed state, and avoiding marking the stripe as REBUILD NEEDED at the same time.

18. A storage system, comprising:

a cache device, a storage device group, and a control circuitry configured to:

at the cache device, receive an input/output (I/O) request for the storage system from a host;

in response to the received I/O request:

(i) determine whether predetermined conditions are satisfied, the predetermined conditions at least comprising:

the storage system being just recovered from a hardware failure, and a storage device group in the storage system being in a ready but degraded state; and (ii) in response to determining that all the predetermined conditions are satisfied, send a Recover State I/O request to the storage device group, so as to allow the storage device group to return a RECOVER NEEDED message indicating that the storage device group is in a recover needed state; and at the storage device group, receive a Recover State input/output (I/O) request from the cache device, the Recover State I/O request allowing the storage device group to return a RECOVER NEEDED message indicating that the storage device group is in a RECOVER NEEDED state;

in response to the received Recover State I/O request, determine whether predetermined conditions are satisfied, the predetermined conditions at least comprising the storage device group being in a degraded state; and in response to determining that the predetermined conditions are not fully satisfied, send a message to the cache device to indicate that the Recover State I/O request is an invalid request.

19. A computer program product having a non-transitory computer readable medium which stores a set of instructions for reducing a data lost window in a storage system; the set of instructions, when carried out by computerized circuitry, causing the computerized circuitry to perform a method of:

receiving an input/output (I/O) request for the storage system from a host;

in response to the received I/O request,
determining whether predetermined conditions are satisfied, the predetermined conditions at least comprising:
the storage system being just recovered from a hardware failure, and
a storage device group in the storage system being in a ready but degraded state;
in response to determining that all the predetermined conditions are satisfied, sending a Recover State I/O request to the storage device group, so as to allow the storage device group to return a RECOVER NEEDED message indicating that the storage device group is in a recover needed state; and
in response to receiving the RECOVER NEEDED message from the storage device group, adding the received I/O request to a pending queue of the cache device.

20. A computer program product having a non-transitory computer readable medium which stores a set of instructions for reducing a data lost window in a storage system; the set of instructions, when carried out by computerized circuitry, causing the computerized circuitry to perform a method of:

receiving a Recover State input/output (I/O) request from a cache device of the storage system, the Recover State I/O request allowing a storage device group to return a RECOVER NEEDED message indicating that the storage device group is in a RECOVER NEEDED state;

in response to the received Recover State I/O request, determining whether predetermined conditions are satisfied, the predetermined conditions at least comprising the storage device group being in a degraded state; and in response to determining that the predetermined conditions are not fully satisfied, sending a message to the cache device to indicate that the Recover State I/O request is an invalid request.

* * * * *